United States Patent
Keashly et al.

(10) Patent No.: US 6,330,289 B1
(45) Date of Patent: Dec. 11, 2001

(54) SYSTEM FOR IMPROVING BASE STATION AMPLIFIER PERFORMANCE

(75) Inventors: Dusty Keashly; Eric Stephen Fayeski, both of Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/172,995

(22) Filed: Oct. 16, 1998

(51) Int. Cl.[7] .......................... H04L 25/03; H04L 25/49; H04L 27/36; H04K 1/02

(52) U.S. Cl. .............................. 375/297; 375/298

(58) Field of Search .................. 375/297, 298; 357/150, 242; 455/561, 114, 67.6; 330/52

(56) References Cited

U.S. PATENT DOCUMENTS

| | | | | |
|---|---|---|---|---|
| 4,179,657 | * | 12/1979 | Hobbs | 325/33 |
| 5,408,504 | | 4/1995 | Ostman . | |
| 5,646,631 | * | 7/1997 | Arntz | 342/373 |
| 5,770,971 | * | 6/1998 | McNicol | 330/52 |
| 5,862,459 | * | 1/1999 | Charas | 455/114 |
| 6,006,111 | * | 12/1999 | Rowland | 455/561 |
| 6,031,880 | * | 2/2000 | Li et al. | 375/326 |
| 6,094,458 | * | 7/2000 | Hellberg | 375/242 |

FOREIGN PATENT DOCUMENTS

| | | | |
|---|---|---|---|
| 404360434A | * | 12/1992 | (JP) . |
| 405048536 | * | 2/1993 | (JP) . |

* cited by examiner

*Primary Examiner*—Stephen Chin
*Assistant Examiner*—Tony Al-Beshrawi
(74) *Attorney, Agent, or Firm*—Jeff Measures

(57) ABSTRACT

Base station multi-channel power amplifier (MCLPA) performance is improved by reducing intersymbol correlation. The system produces a number of bit stream signals to be modulated into a number of symbol stream signals, and includes means for introducing an offset/time delay to the symbol stream signals to avoid correlation of the symbol transitions in the MCLPA. By doing this, the system avoids multiple symbols going into transition at the same time. By preventing the signal peaks from occurring at the same time and reinforcing to form a larger peak signal, the system reduces the maximum peak signal power, without adversely affecting the average signal power. This reduces the peak power requirements placed on the MCLPA. Preferably the sum total of all offsets is less than one symbol period.

31 Claims, 6 Drawing Sheets

SYSTEM FOR IMPROVING BASE STATION AMPLIFIER PERFORMANCE

FIELD OF THE INVENTION

The present invention relates to base station multi-channel power amplifier (also called a multi-channel linear power amplifier or MCLPA) performance.

BACKGROUND TO THE INVENTION

We will discuss the invention with reference to an example cellular system for which the invention is beneficial, namely IS-54-B Cellular System Dual-Mode Mobile Station—Base Station Compatibility Standard (800 MHz AMPS/TDMA cellular systems). Existing Multi-Channel Power Amplifiers (MCLPAs) used in IS-54-B cellular systems must function with both analog and digital modulation schemes. MCLPAs must provide a highly linear response over a large dynamic range. This wide dynamic range is required since the characteristics of the signals amplified by the MCLPA include a very large peak-to-average signal power.

Individual signals being fed into the amplifier have an inherently high peak-to-average signal power. The largest component of the peak signal power occurs whenever a modulation symbol goes through transition. Multiple input signals increase the total peak-to-average signal power whenever modulation transitions on multiple signals occur at the same time effectively increasing the amplitude of the peak transient.

AMPS analog transmission is based upon one traffic channel per Radio Frequency (RF) carrier. In TDMA mode, three traffic channels are imposed on one RF carrier using digital modulation techniques. The ensuing linearity requirements in TDMA mode call for a highly linear power amplifier to maintain modulation mask integrity.

A problem with TDMA modulation when applied to an MCLPA environment is periodic correlation of symbol transitions. In a typical system, a base station is connected to the rest of the wireless network by one or more T1 connections. Multiple signals are carried by each T1 link, and there is a correlation between the multiple signal streams in the form of synchronized data bit transitions. For example, bits arriving on a T1 span will have an inherent correlation to the T1 span clock when they arrive at the base station span adapter. Modulation symbols represent one or more data bits (in the case of IS-54-B one modulation symbol represents two data bits). Timing correlations between multiple data bit streams at the span adapter will translate into timing correlations of the subsequent modulation symbols.

This correlation sometimes increases the peak input power far above the average power, and drives the MCLPA into a less linear state, generating Intermodulation Distortion (IMD) above the levels specified in IS-54-B.

MCLPAs are typically advertised with a continuous maximum rated power using a Continuous Wave (CW) carrier, such as Maximum 50 Watts CW. In order to avoid this problem in the past, many approaches have been attempted to ensure that adequate linearity is maintained. For example, cellular operators running these MCLPAs in TDMA mode have had to reduce the input drive (effectively the overall output power) to ensure that adequate linearity is maintained at the peak signal power levels. However, reducing total output power negatively affects cost, performance, and network capacity.

The prior art has seen manufacturers of cellular base station amplifier systems attempt many solutions to this problem. These prior art solutions have focused on design concepts to increase amplifier linearity. Error amplification, feedback, pre-distortion and feed-forward control techniques are commonly employed to increase the range of linearity of the amplifiers in order to avoid these problems. All of these techniques to enhance linearity of the MCLPA are accompanied by increased cost. While necessary for TDMA systems, this increased cost offers little benefit during AMPS operation, as the required degree of linearity for analog transmission is much less than digital requirements needed to support TDMA signals.

Therefore, there exists a need for an improved system which will overcome these problems at a reduced cost.

SUMMARY OF THE INVENTION

An object of the present invention is to provide improved base station multi-channel power amplifier (MCLPA) performance. However, unlike prior art solutions which have focused on enhancing the linearity of the MCLPA, the inventors herein have designed a system which decreases the linearity requirements for the MCLPA while operating in digital mode. This is achieved by reducing the peak-to-average signal power of the combined signals before amplification at the MCLPA. By reducing the peak signal power, this invention can advantageously reduce the cost per channel per Watt compared to conventional systems.

According to one aspect of the invention, there is provided a system which produces a number of bit stream signals to be modulated into said number of symbol stream signals, said system including means for introducing an offset/time delay to said symbol stream signals to avoid correlation of the symbol transitions in the MCLPA. By doing this, the system avoids multiple symbols going into transition at the same time. By preventing the signal peaks from occurring at the same time and reinforcing to form a larger peak signal, the system reduces the maximum peak signal power, without adversely affecting the average signal power. This reduces the peak power requirements placed on the MCLPA. Preferably, the sum total of all offsets (i.e., the maximum delay) is less than one symbol period. Note that the terms offset and time delay are used synonymously in this specification.

According to one embodiment these time delays can be introduced into the bit stream signals prior to modulation. In such a system the sum total of all offsets (i.e., the maximum delay) is preferably less than one bit period unless the system accounts for symbol boundaries in order to ensure no overlap of symbol transitions between the individual symbol streams.

Alternatively, said unique offsets/delays can be introduced to the symbol streams after symbol formation. By offsetting the symbol streams directly, the maximum delay introduced is extended to one symbol period from one bit period. The offset can be introduced by hardware or software at any point in the system after span adaption and prior to signal combining.

In accordance with a broad aspect of the present invention there is provided apparatus for reducing intersymbol correlation comprising: means for receiving a plurality of bit stream signals; means for modulating said plurality of bit stream signals to produce a plurality of symbol stream signals for amplification by a multi-channel power amplifier (MCLPA); and means for introducing a time offset in said symbol stream signals prior to amplification.

In accordance with another aspect of the invention, there is provided apparatus for reducing symbol correlation comprising: a span adapter whose output comprises a plurality of bit stream signals; a plurality of channel elements, wherein each channel element receives one of said plurality of bit stream signals and produces a corresponding symbol stream signal; and delay means for introducing a time offset in each of said symbol stream signals prior to amplification.

BRIEF DESCRIPTION OF THE DRAWINGS

The present invention, together with further objects and advantages thereof will be further understood from the following description of the preferred embodiments with reference to the drawings in which:

FIG. 4a is block diagram illustrating the forward data stream signal flow in a single channel path within the base station according to an embodiment of the invention.

FIG. 4b illustrates the details of the n-stage delay block of FIG. 4a.

DETAILED DESCRIPTION OF THE PREFERRED EMBODIMENTS

Figure 1:
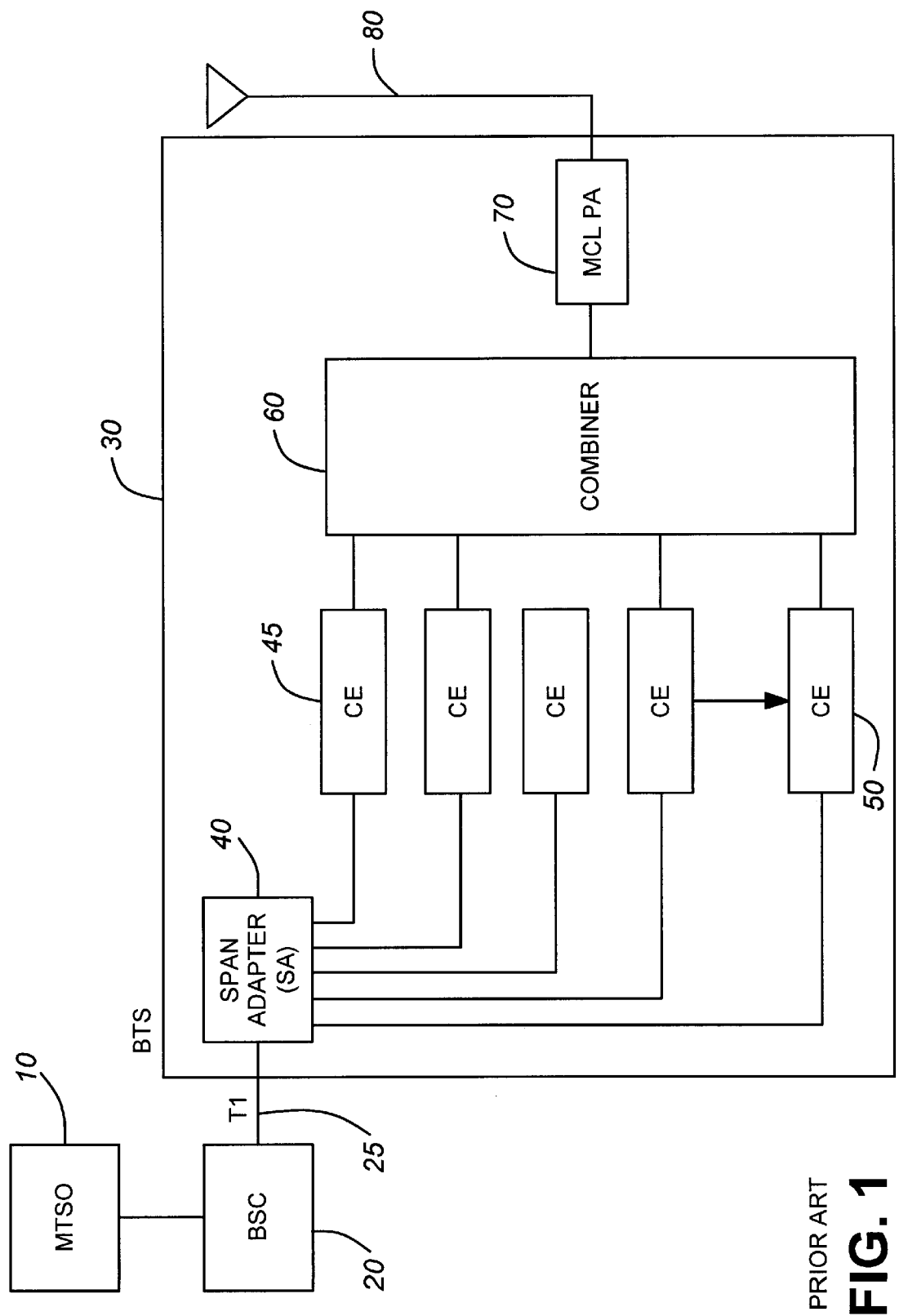
FIG. 1 illustrates a generic cellular system for which the invention is useful.

FIG. 1 illustrates a generic cellular system which is shown in order to illustrate how the invention is used. In FIG. 1, there is a mobile telephone switching office (MTSO) 10, also known as a mobile switching center or MSC, a base station controller (BSC) 20 which is connected to a base transmission station (BTS) 30 by incoming multiplexed data facilities, for example by T1 links 25. The BTS 30, also called a base station, includes a span adapter 40 which performs multiplex/de-multiplex functions in order to distribute and demodulate the incoming T1 data streams. The base station also includes a plurality of channel elements (CE) 45–50, a combiner 60 connected to a multi-channel power amplifier (MCLPA) 70 which is then coupled to antenna 80. Each channel element typically comprises a transmitter and receiver, which are typically coupled together to form a radio transceiver, which is also called a transceiver radio unit (TRU). The base station also includes a controller (not shown) including a processor and memory for storing instructions for controlling its operations.

Note that FIG. 1 does not illustrate all of the components of a base station, or a cellular network for that matter, and only includes the parts needed to illustrate how to use the invention. Note that the number of channel elements in the base station can vary depending on the number of radio channels supported by the base station.

In operation, the span adapter 40 receives a plurality of signals multiplexed together in the T1 link. The span adapter de-multiplexes these signals and produces an output for each channel element. Bit timing correlation between the various output streams is introduced by the de-multiplexing of the data streams from the common span input. Each output signal from the span adapter 40 represents a digital bit stream signal input to a channel element. Each channel element receives a digital bit stream signal as an input, modulates the signal, for example, by means of a differential phase encoder (assuming DQPSK encoding) to produce a symbol stream signal which is then converted to the appropriate RF frequency. The combiner 60 then combines each RF signal for amplification by the MCLPA 70.

Figure 2:
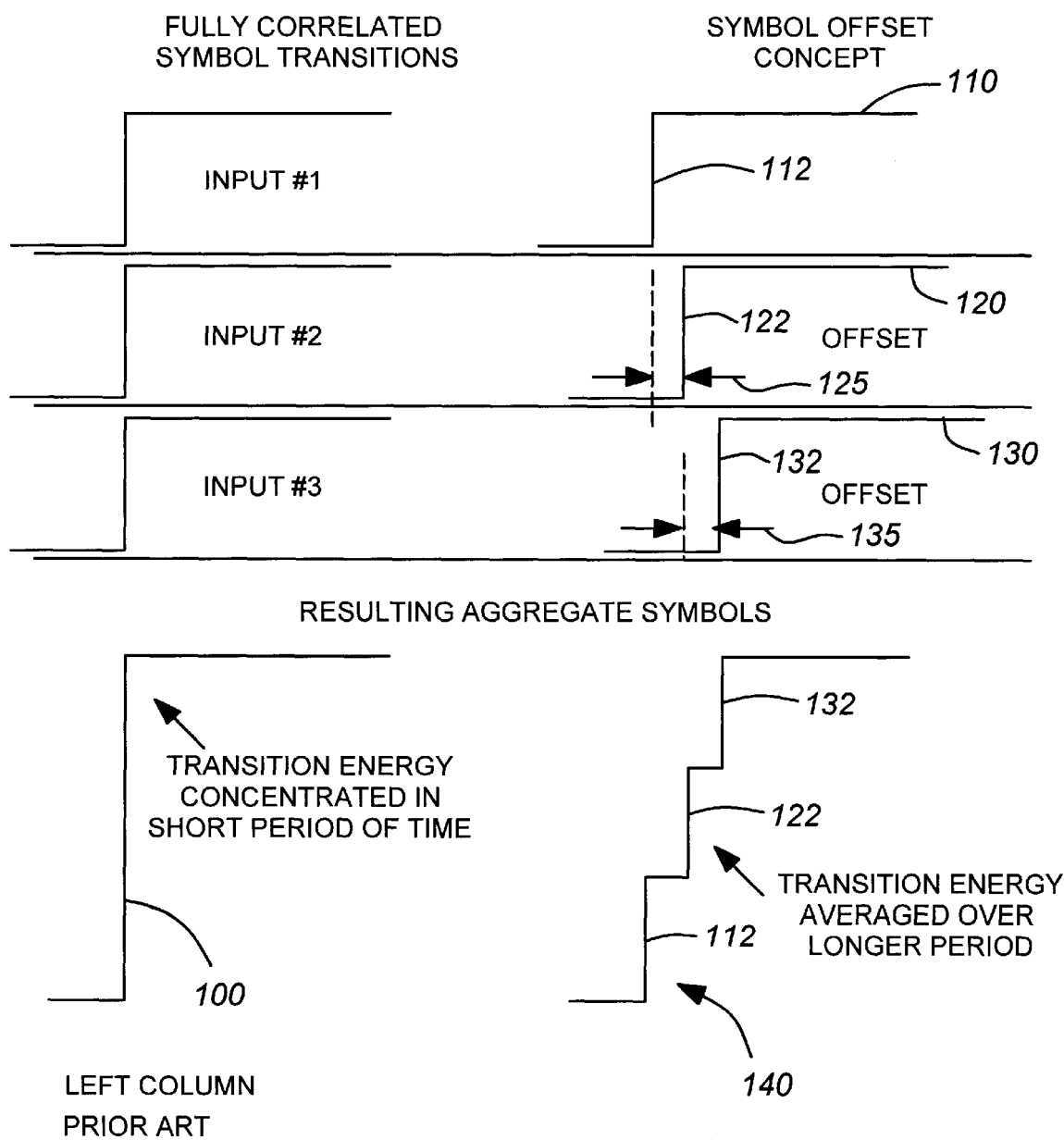
FIG. 2 illustrates the differences in transition energy between a set of three input signals having fully correlated signal transmissions according to a prior art design in the left column and a series of three input symbol streams wherein each input stream has an enforced offset according to an embodiment of the invention in the right column.

FIG. 2 compares the transition energy of the combined signal, e.g., the output from the combiner 60 for a set of three fully correlated symbol stream signals on the left hand column with the transition energy of the combined signal for a set of three symbol stream signals having relative time offsets according to an embodiment of the invention on the right hand column. In FIG. 2, three symbol stream signals, labelled as input number 1, input number 2, and input number 3 respectively, all arrive at the combiner at the same time. Each symbol stream signal is assumed to have the same timing in the left hand column. As can be seen in the resulting aggregate symbol signal 100, the peak transition energy is concentrated in a very short time interval when all three input signals produce fully correlated symbol transitions.

In the right hand column of FIG. 2, the symbol offset concept is illustrated. Three input symbol stream signals, 110, 120 and 130 having symbol transitions 112, 122, and 132 respectively are shown. There is a time offset 125 added to signal 120 in order to introduce a relative delay between the symbol transition 112 of signal 110 and the symbol transition 122 of signal 120. Similarly, there is another offset 135 added to signal 130 in order to introduce a relative delay between symbol transitions 132 and 122. These offsets prevent the symbols of signal 110, 120 and 130 from being correlated, resulting in the combined signal 140 having offset transitions 112, 122 and 132, thus averaging the transition energy over a longer period of time. Thus, the combined signal 140 has a lower peak signal power than the correlated signal 100. According to one embodiment, the size of the enforced offsets 125 and 135 are the same. Thus, the offset between signal 130 and 110 is twice the offset between signal 120 and 110. Note that a zero offset is added to signal 110 as the signals only need to be delayed relative to each other.

Figure 3:
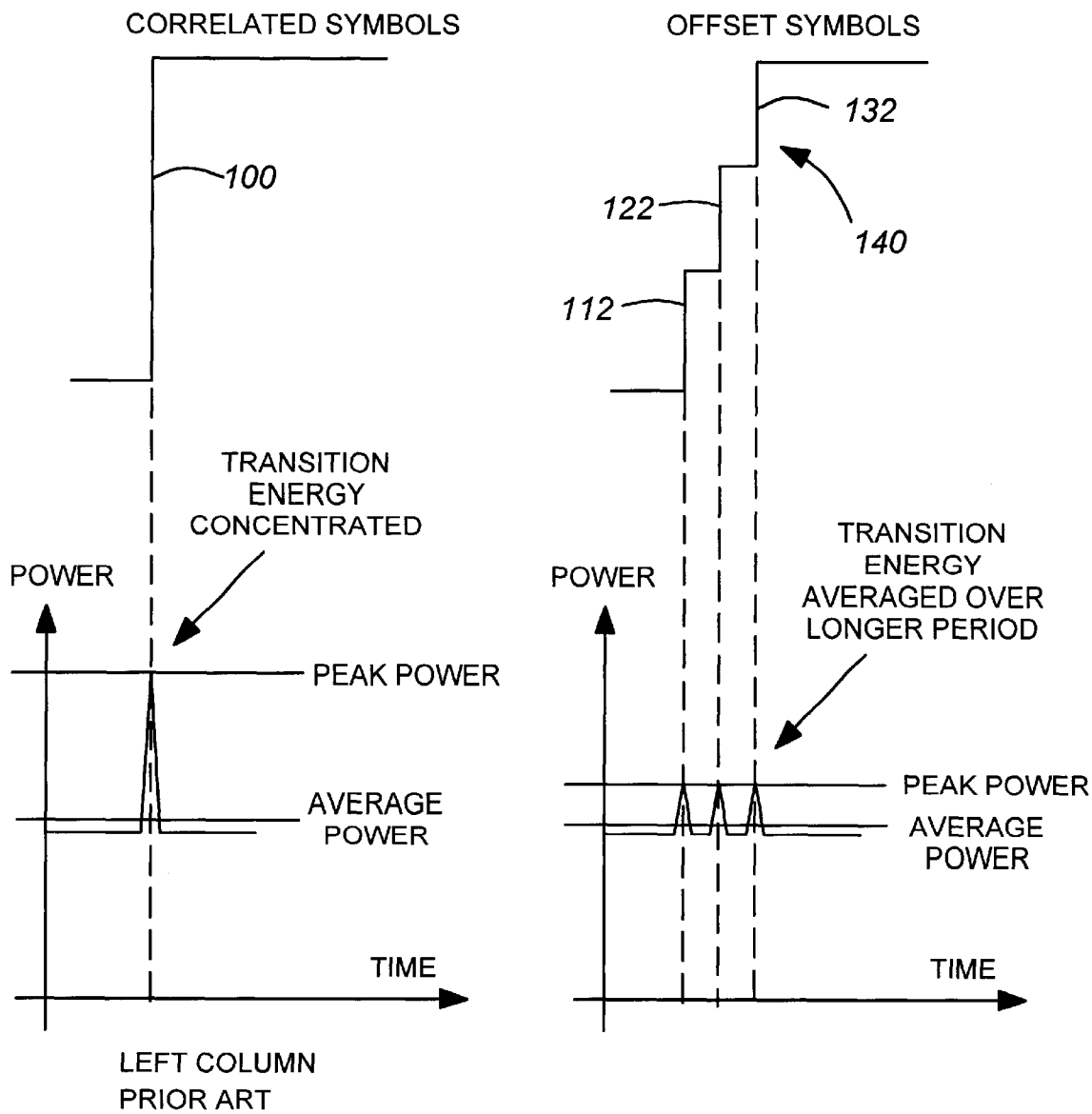
FIG. 3 illustrates the peak and average power of the combined signals of FIG. 2, with correlated symbols according to a prior art design on the left column and with offset symbols according to an embodiment of the present invention on the right column.

The differences in the peak power and the average power of the combined signals of FIG. 2 is illustrated in FIG. 3. Note in FIG. 3 signal 100 with the correlated symbols has a significant peak power spike due to the concentration of the transition energy of the correlated symbol signal. This is contrasted with the offset symbol signal 140 having three separate transitions 112, 122, and 132 for the three signals resulting in three smaller peak spikes. As should be apparent to a person skilled in the art, the amplifier's dynamic signal range requiring high linearity will be significantly less with signal 140 having three smaller peak power spikes than significantly higher peak power spike of the correlated symbol signal. Thus, the addition of the time offsets 125 and 135 reduce the peak power requirements for the MCLPA. Furthermore, by reducing the peak power requirements for the MCLPA, the system can either provide more channels (lower cost per channel) or additional transmit power (lower cost per usable Watt) for any given MCLPA or the system will require an MCLPA with a reduced dynamic range (lower material cost).

Note that FIGS. 2 and 3 should be taken as conceptual illustrations. As should be noted by a person skilled in the art, the symbol transitions themselves are not actually instantaneous.

Figure 4:
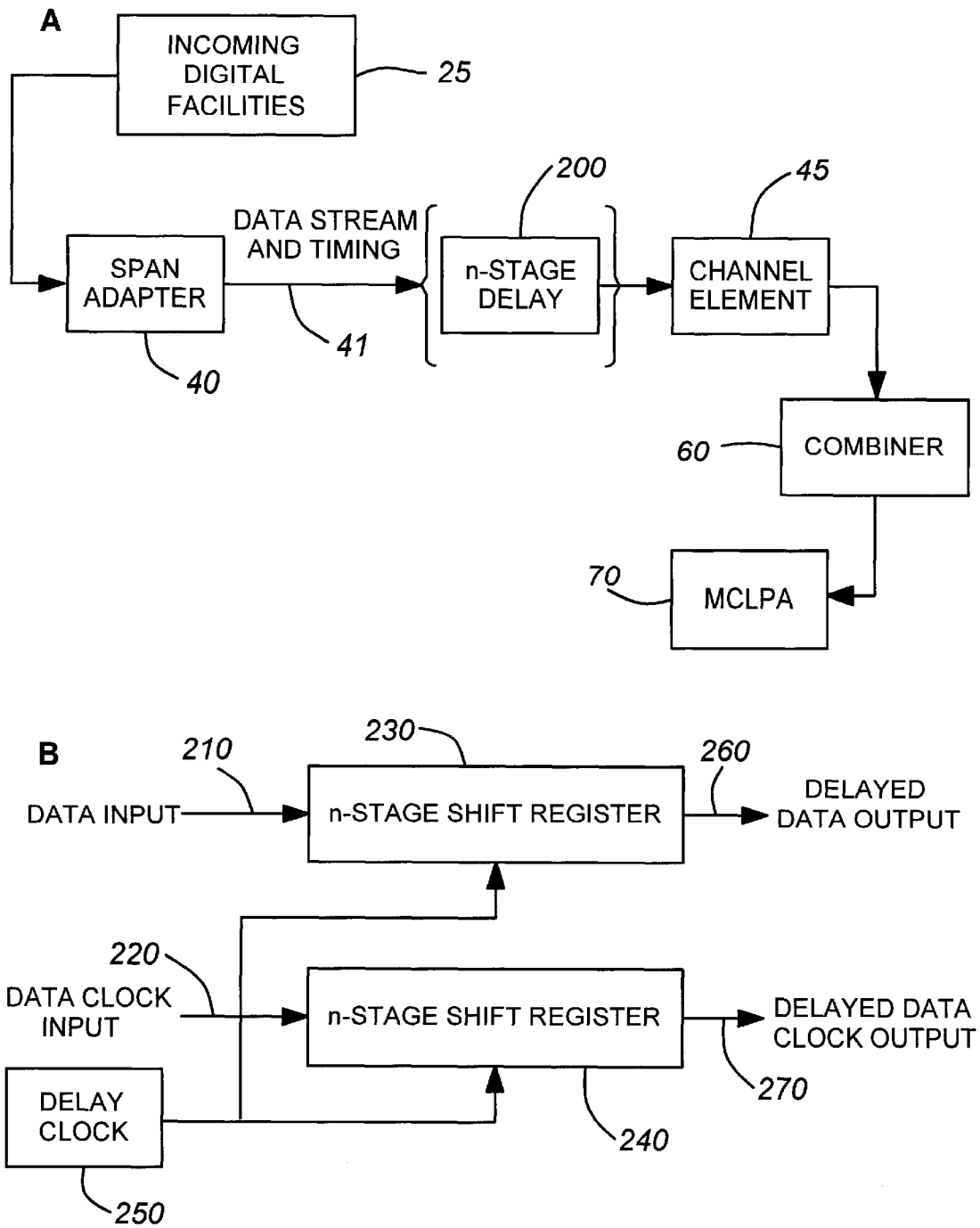
Figure 5:
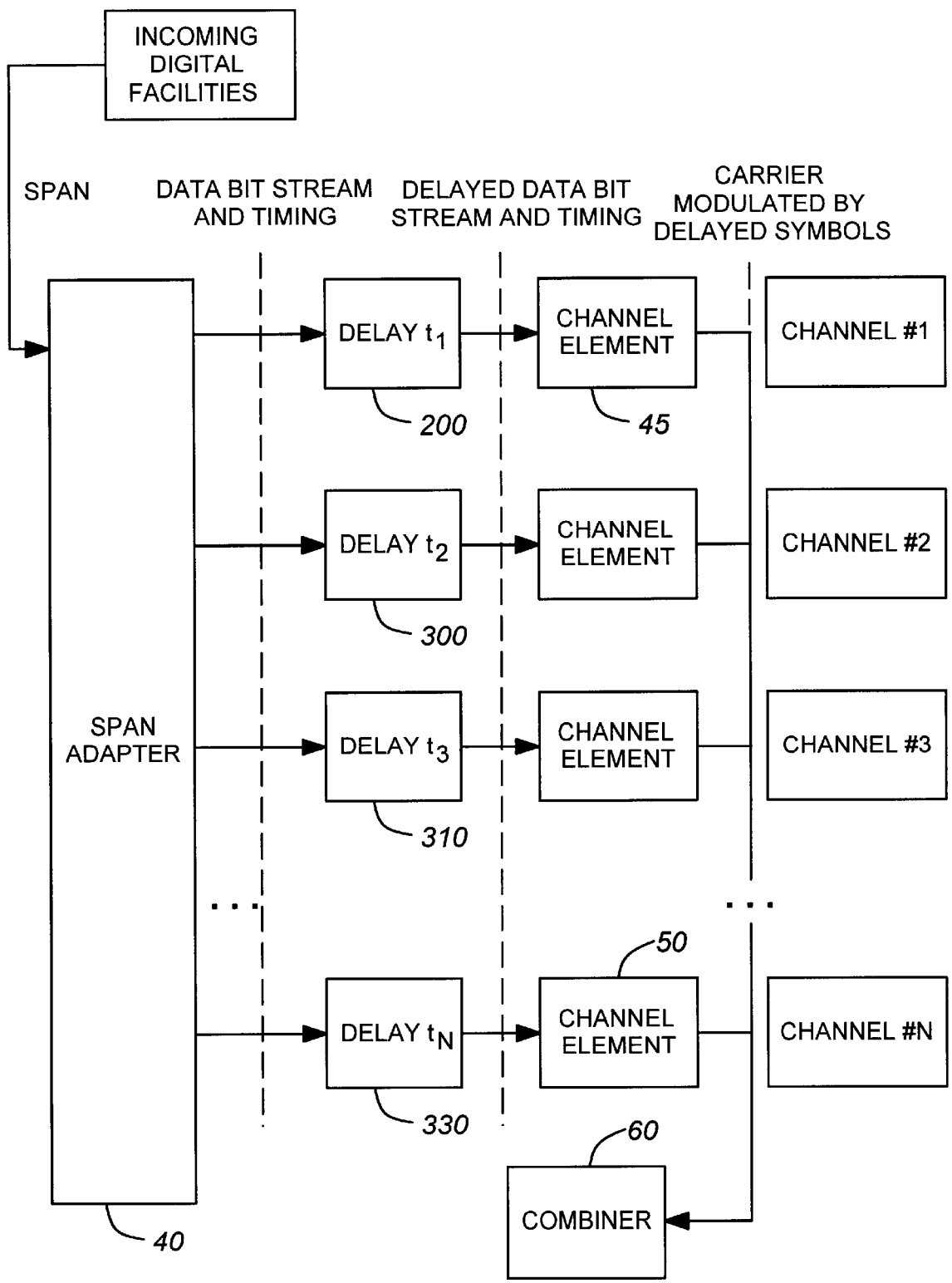
FIG. 5 illustrates the forward data stream flow for multiple channel elements connected to a single MCLPA within a base station according to an embodiment of the present invention.

FIG. 4 and FIG. 5 illustrate an embodiment for adding the relative offsets. FIG. 4 illustrates the forward data stream signal flow for a single path in FIG. 4a and FIG. 4b illustrates the details of the n stage delay block of FIG. 4a. FIG. 5 illustrates an embodiment for implementing the delay block of FIG. 4 in a base station having multiple channel elements connected to a single MCLPA. With reference to FIG. 4a, the incoming digital facilities, for example the T1 stream 25 from the base station controller 20 of FIG. 1 is received by the span adapter 40. Each of the outputs from the span adapter 40 represents a data bit stream and timing signal, for example signal 41 which is then sent to the channel element 45. Bit transition correlation between the various output streams is introduced by the de-multiplexing of the data streams from the common span input. Prior to entering the channel element 45, the bit stream output from the span adapter 40 passes through the n-stage delay block 200, the details of which is shown in FIG. 4b. The relative delays between the bit streams removes the bit transition correlation between the multiple streams introduced by the de-multiplexing of the span data stream.

We have noted that each bit stream output signal from the span adapter 40 can be described as a data bit stream and timing signal. For example, in FIG. 4b the bit stream signal 41 is shown to include a data input signal 210 and an associated data clock input signal 220. These signals are fed to parallel n-stage shift registers 230 and 240 which implement the n-stage delay according to this embodiment. A delay clock 250 is used to provide the clocked control of the n-stage shift registers for adding the time delay/offset to produce the delayed data output signal 260 and the delayed data clock output signal 270. Thus, the offset is added to both the data bit stream signal and its timing.

FIG. 5 illustrates the forward data stream flow for N multiple channel elements connected to a single combiner for amplification by an MCLPA. In FIG. 5, a T1 input to the span adapter 40 is de-multiplexed into N channels each of which passes through a delay block e.g. 200, 300, 310, 330 before going to channel elements e.g. 45, 50. Thus, according to this embodiment, each channel goes through the following stages. Output from the span adapter 40, which represents a data bit stream (along with its associated timing), is passed through a delay stage, wherein a relative offset is added, and then the delayed data bit stream and timing signal is then passed to the channel element whose output represents a carrier modulated by delayed symbols which is then sent to the combiner 60 prior to amplification by the MCLPA 70 not shown. Preferably, the total delay added to each channel by its respective delay block is unique for each clocked data stream connected to the same MCLPA, so that no two symbols are correlated. Preferably, in order to ease implementation, the delay added between any two consecutive channels (delay stage) is the same. Thus, each delay block would add a Number_of_Delay_Stages (number of time delay periods) dependent on the channel number as shown in the table below:

TABLE 1 n-stage Time Delay Mapping

| Channel Number | Number of Time Delay Periods (delay stages) |
|---|---|
| 1 | 0 |
| 2 | 1 |
| 3 | 2 |
| ... | ... |
| N | N-1 |

Note that no delay is added for Channel number 1, as the signals only need be delayed relative to each other. Thus, no n-stage registers are required for Channel number 1 (e.g., delay block 200 is not required). However, as these n-stage registers are relatively cheap, it is preferable to include a delay block for each channel to simplify manufacturing, and simply set delay block 200 to add zero time delay periods (delay stages).

The actual time delay per channel (Channel_Time_Delay) which is added is determined based on the period of the delay clock 250 (Delay_Clock_Period):

Channel_Time_Delay (sec)=Delay_Clock_Period (sec)*Number_of_Delay_Stages

Assuming the system only has knowledge of bit streams in full alignment and the delay is introduced without knowledge of symbol alignment, suitable delay periods will avoid symbol overlap if the:

Delay_Clock_Period<(Data_Bit_Period/(Max_#_of_Channels_per_MCLPA+1))

To extend the maximum delay beyond 1 bit period, knowledge of the number of bits per symbol and the symbol alignment in the individual bit streams is required. Assuming the system has all symbol streams in full alignment initially and has knowledge of this symbol alignment between the various channels, a suitable delay clock period will remove symbol alignment if the:

Delay_Clock_Period<(Symbol_Period/(Max#_of_Channels_per_MCLPA+1))

However, this can add complexity. For example, the lead bits which form the start of each symbol should be identified and should be in correlation across the streams. If the lead bits are not correlated (say in a 2 bit per symbol system where stream A has symbol led bits at times n, n+2, n+3 and stream B has symbol lead bits at times n+1, n+3, n+5), shifting stream A by 1 bit period relative to stream B would cause the symbol streams from A and B to correlate on symbol transitions. Therefore, it is simpler to limit the maximum delay to 1 bit period for the embodiment shown in FIG. 5.

Figure 6:
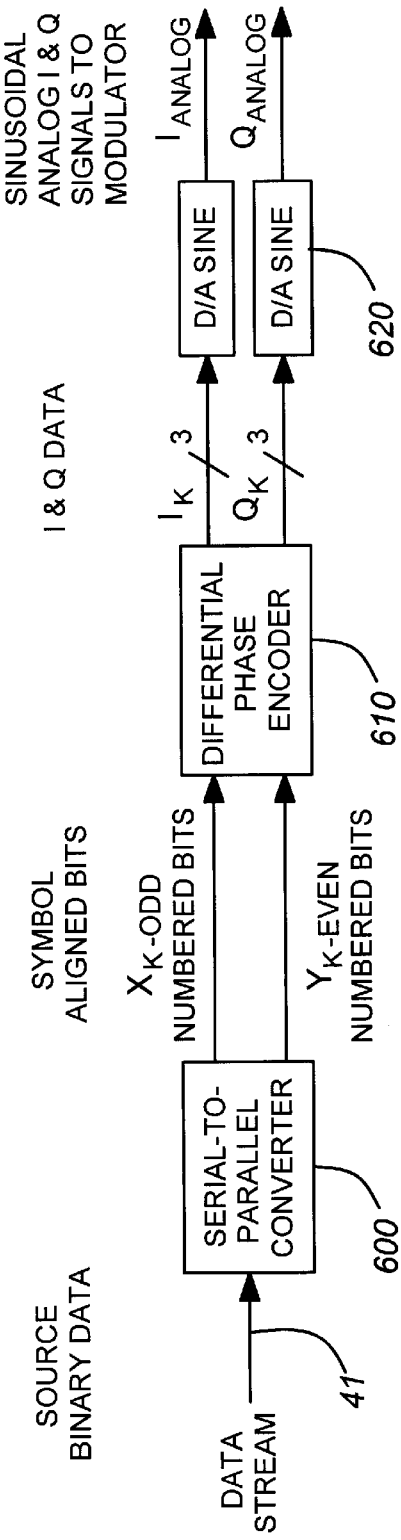
FIG. 6a illustrates an example of a DQPSK (differentially encoded quadrature phase shift keying) modulation system and FIG. 6b illustrates example opportunities to introduce the symbol delay in such an example modulation scheme.
Figure 6:
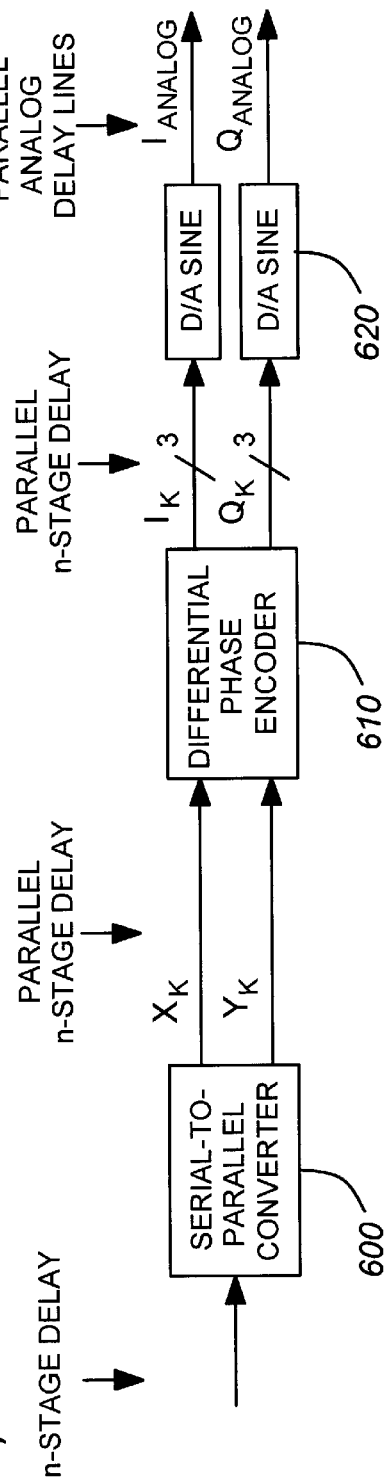

However, in alternative embodiments, the offsets/delays can be introduced to the symbol streams after symbol formation. By offsetting the symbol streams directly, the maximum delay introduced can be extended to one symbol period from one bit period, without the above mentioned complexity involved in extending the delay prior to symbol formation. This is advantageous because, by extending the delay, the symbol transitions can be further separated in time. This is advantageous for systems with many channels in order to decrease partial symbol overlap, as the symbol transitions themselves are not actually instantaneous, as stated above. Alternative embodiments of the invention will be discussed below with reference to FIG. 6. In summary, the offset can be introduced by hardware or software at any point in the system after the span adapter and prior to signal combining.

FIG. 6a illustrates an example of the DQPSK encoding process that typically takes place in the channel element according to IS-54-B, and FIG. 6b illustrates, by way of an example, four opportunities to introduce the desired symbol delay according to different embodiments of the invention. These examples should not be taken as exhaustive as the delay can be implemented anywhere between the de-multiplex operation carried out by the span adapter 40 and the signal combining operation carried out by the combiner 60. With reference to FIG. 6a, the bits stream (data and timing) signal 41 is split by Serial-to-Parallel Converter 600 to produce $X_k$ (odd numbered bits) and $Y_k$ (even numbered bits), wherein k is a bit number in a stream. An X bit and Y bit are combined to form one symbol (numbered "k" in the symbol stream). These signals are then DQPSK modulated by differential phase encoder 610, producing $I_k$ and $Q_k$ signals, resulting in two bits per symbol (2:1 ratio). These signals, which are still digital, are converted to analog sinusoidal signals by Digital-to-Analog converters 620. Note that other Channel Element circuitry, for example, circuitry for upconverting the sinusoidal signals to RF frequencies, is not shown.

As stated, FIG. 6b illustrates, by way of example, four opportunities to introduce the desired symbol delay according to different embodiments of the invention. The first example uses an n-stage delay (for both the data, and its timing) prior to splitting the signals in the Serial-to-Parallel Converter block 600, as illustrated in FIGS. 4 and 5. The next two examples utilize parallel n-stage delays (for both the data, and its timing) for delaying each of the split signals, either before, or after the differential phase encoder 610. The fourth example implements analog delays, for example, analog delay lines, in order to add the delay to the symbol stream signals after the digital to analog conversion. Of course, other equivalent delay devices can be used, for example, stacked gate delays or, in the case of the last example, charged couple devices. Furthermore, the delays can be implemented in software if, for example, a DSP is used.

Note that we have discussed the preferred embodiment with reference to an example cellular system for which the invention is beneficial, namely IS-54-B (800 MHz AMPS/TDMA cellular systems) using DQPSK modulation. It should be noted that the invention can be utilized in other systems which do not require symbol correlation, for example systems which use 8-PSK (8 state phase shift keying) modulation.

Numerous modifications, variations and adaptations may be made to the particular embodiments of the invention described above without departing from the scope of the invention, which is defined in the claims.

What is claimed is:

1. Apparatus for reducing intersymbol correlation within a Time Division Multiple Access (TDMA) system comprising:
    means for receiving a plurality of bit stream signals;
    means for modulating said plurality of bit stream signals to produce a plurality of symbol stream signals for amplification by a multi-channel linear power amplifier (MCLPA); and
    means for introducing a time offset in said symbol stream signals prior to amplification.

2. Apparatus as claimed in claim 1 wherein said means for introducing a time offset includes means for introducing a unique offset in each signal.

3. Apparatus as claimed in claim 2, wherein the maximum offset introduced in any signal is less than one symbol period.

4. Apparatus as claimed in claim 1 wherein said means for introducing a time offset in said symbol stream signals comprises means for introducing a multiple of a fixed delay period to each signal, wherein said multiple starts at zero for the first signal, and is incremented for each subsequent signal, such that the total delay introduced for the last signal is less than one symbol period.

5. Apparatus as claimed in claim 4 wherein there is both a data signal and an associated timing signal for each signal and said means for introducing a time offset comprises means for introducing said offset to both the data and its associated timing.

6. Apparatus as claimed in claim 5 wherein said means for introducing a time offset comprises a digital delay means for adding said offset to each bit stream signal prior to modulation by said means for modulating.

7. Apparatus as claimed in claim 6 wherein said digital delay means introduces said offset such that the total delay introduced for the last signal is less than one bit period.

8. Apparatus as claimed in claim 5 wherein said means for introducing a time offset comprises a delay means for adding said offset to each symbol stream after modulation by said means for modulating but before amplification by said MCLPA.

9. Apparatus as claimed in claim 8 wherein said means for modulating comprises a channel element for each signal, and wherein each channel element includes signal modulator and a Digital to Analog (D/A) Conversion means and wherein said delay means comprises digital delay means prior to D/A conversion.

10. Apparatus as claimed in claim 8 wherein said means for modulating comprises a channel element for each signal, and wherein each channel element includes a signal modulator and a Digital to Analog (D/A) Conversion means and wherein said delay means comprises analog delay means after said D/A conversion.

11. A Base station comprising the apparatus as claimed in claim 1.

12. A Base station comprising the apparatus as claimed in claim 5.

13. Apparatus for reducing symbol correlation within a Time Division Multiple Access (TDMA) system comprising:
    a span adapter whose output comprises a plurality of bit stream signals;
    a plurality of channel elements, wherein each channel element receives one of said plurality of bit stream signals and produces a corresponding symbol stream signal; and
    delay means for introducing a time offset in each of said symbol stream signals prior to amplification.

14. Apparatus as claimed in claim 13 wherein said delay means includes means for introducing a unique offset in each signal.

15. Apparatus as claimed in claim 14, wherein the maximum offset introduced in any signal is less than one symbol period.

16. Apparatus as claimed in claim 14 wherein said delay means comprises means for introducing a multiple of a fixed delay period to each signal, wherein said multiple starts at zero for the first signal, and is incremented for each subsequent signal, such that the total delay introduced for the last signal is less than one symbol period.

17. Apparatus as claimed in claim 16 wherein there is both a data signal and an associated timing signal for each bit stream signal and said delay means comprises means for introducing said offset to both the data and its associated timing.

18. Apparatus as claimed in claim 17 wherein said delay means is located between said span adapter and said plurality of channel elements.

19. Apparatus as claimed in claim 17 wherein said delay means is located within said span adapter.

20. Apparatus as claimed in claim 17 wherein said delay means comprises a delay block within each of said plurality of channel elements.

21. Apparatus as claimed in claim 17 wherein said apparatus further comprises a combiner for combining the output signals from each of said plurality of channel elements prior to amplification and said delay means comprises a delay block within said combiner.

22. Apparatus as claimed in claim 17 wherein each channel element includes a signal modulator and a Digital to Analog (D/A) Converter and wherein said delay means comprises digital delay means located prior to said D/A Converter.

23. Apparatus as claimed in claim 17 wherein each channel element includes a signal modulator and a Digital to Analog (D/A) Converter and wherein said delay means comprises analog delay means located after said D/A Converter.

24. A Base station comprising the apparatus as claimed in claim 13.

25. A Base station comprising the apparatus as claimed in claim 17.

26. A span adapter for a base station connected to incoming multiplexed data facilities, said base station comprising a plurality of channel elements, a signal combiner and a multi-channel power amplifier, said span adapter comprising a demultiplexer for demultiplexing said data streams to produce an output bit stream signal for each of said channel elements and delay means for introducing a time offset in each of said bit stream signals, wherein symbol transitions produced by said channel elements do not correlate when said signals are combined in said combiner.

27. A channel element for a base station connected to incoming multiplexed data facilities, said base station comprising a plurality of said channel elements and a span adapter for demultiplexing said data streams to produce an output bit stream signal for each of said channel elements, said channel element comprising:

means for converting a received one of said output bit stream signals into a symbol stream signal having symbol transitions; and delay means for introducing a time offset in said symbol stream signal prior to amplification, wherein said symbol transitions do not correlate with symbol transitions of signals produced by other of said plurality of channel elements.

28. A channel element as claimed in claim 27 wherein said means for converting comprises:

a serial-to-parallel converter for splitting said received output bit stream signal into a pair of symbol aligned bit stream signals;

an encoder for converting said pair of symbol aligned bit stream signals into a symbol stream signal; and a Digital to Analog (D/A) Converter for converting the output from said encoder into an analog sinusoidal signal modulated by symbols; and wherein there is both a data signal and an associated timing signal for each bit stream signal and said delay means comprises means for introducing said offset to both the data and its associated timing.

29. A channel element as claimed in claim 28 wherein said delay means comprises digital delay means located between said serial-to-parallel converter and said encoder.

30. A channel element as claimed in claim 28 wherein said delay means comprises digital delay means located between said encoder and said Digital to Analog (D/A) Converter.

31. A channel element as claimed in claim 28 wherein said delay means comprises analog delay means located after said Digital to Analog (D/A) Converter.

* * * * *